US006728017B2

(12) United States Patent
Park

(10) Patent No.: US 6,728,017 B2
(45) Date of Patent: Apr. 27, 2004

(54) MICROMIRROR ACTUATOR

(75) Inventor: Hae-seok Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 42 days.

(21) Appl. No.: 09/973,746

(22) Filed: Oct. 11, 2001

(65) Prior Publication Data

US 2002/0067559 A1 Jun. 6, 2002

(30) Foreign Application Priority Data

Dec. 5, 2000 (KR) ........................................ 2000-73482

(51) Int. Cl.[7] ................................................ G02B 26/08
(52) U.S. Cl. ...................................... 359/224; 359/298
(58) Field of Search ................................. 359/223, 224, 359/872, 877, 290, 291, 298; 310/309

(56) References Cited

U.S. PATENT DOCUMENTS

| | | | | |
|---|---|---|---|---|
| 6,044,705 A | * | 4/2000 | Neukermans et al. | .... 73/504.02 |
| 6,046,840 A | | 4/2000 | Huibers | |
| 6,147,790 A | * | 11/2000 | Meier et al. | ................. 359/291 |
| 6,172,797 B1 | * | 1/2001 | Huibers | ....................... 359/291 |
| 6,307,169 B1 | * | 10/2001 | Sun et al. | .................... 200/181 |
| 6,353,492 B2 | * | 3/2002 | McClelland et al. | ......... 359/254 |

* cited by examiner

Primary Examiner—Mark A. Robinson
(74) Attorney, Agent, or Firm—Burns Doane Swecker & Mathis, LLP

(57) ABSTRACT

A micromirror actuator includes a substrate; two posts having predetermined heights and installed a predetermined distance apart on the substrate; a torsion bar ends of which are fixed to respective posts; a stopper extending from a portion of the torsion bar and contacting or coming apart from the surface of the substrate; a mirror connected to the middle portion of the torsion bar; parallel elements connected to the torsion bar being isolated from the mirror and causing the torsion bar to be distorted; and a magnet providing a rotation force to the parallel elements through being affected by an external magnetic field. Accordingly, the rotation characteristics of the mirror of the micromirror actuator of the present invention become insensitive to a change of the strength of the external magnetic field applied after the stopper contacts the surface, thereby uniformly maintaining the rotation angle of the mirror at a desired level.

25 Claims, 8 Drawing Sheets

MICROMIRROR ACTUATOR

This application claims priority under 35 U.S.C. §§119 and/or 365 to 00-73482 filed in Republic of Korea on Dec. 5, 2000; the entire content of which is hereby incorporated by reference.

Priority is claimed to Application Number 00-73482 filed in the Republic of Korea on Dec. 5, 2000, herein incorporated by reference.

BACKGROUND OF THE INVENTION

1. Field of the Invention

The present invention relates to a micromirror actuator, and more particularly, to a micromirror actuator which is capable of effectively preventing a mirror from abnormally operating due to abnormal variation of a torsion bar.

2. Description of the Related Art

Micromirror actuators are optical switching devices used in optical communication devices and holographic optical information recorders. In holographic optical information recorders, mirrors are required to be placed at exact positions for correctly changing an optical path, that is, for switching. A plurality of micromirror actuators are installed in an array in a holographic optical information recorder and must show the same mirror operational characteristics.

FIG. 1 illustrates a conventional micromirror actuator, in which two posts 2a and 2b are installed a predetermined distance apart on a substrate 1, and torsion bars 3a and 3b are formed to extend from a mirror 3. The torsion bars 3a and 3b are connected at one end to the two posts 2a and 2b, respectively. In addition, magnets 4a and 4b are placed at two opposite sides of the mirror 3.

Referring to FIG. 1, the mirror 3 inclines over the substrate 1 by a predetermined angle due to a vertical magnetic field emanating from the substrate 1. Here, one edge of the mirror 3 is in contact with the surface of the substrate 1, and thus the inclination angle of the mirror 3 with respect to the substrate 1 can be maintained. When the mirror inclines over the substrate 1, the torsion bars 3a and 3b having predetermined elastic forces are twisted.

FIG. 2 illustrates the conventional micromirror actuator of FIG. 1 in a state where there is no magnetic field. If the magnetic field affecting the micromirror actuator of FIG. 1 is removed, as illustrated in FIG. 2, the mirror 3 rotates about the torsion bars 3a and 3b so as to be parallel with the surface of the substrate 1 due to the elastic restoring force of each of the torsion bars 3a and 3b.

As shown in FIG. 1, when the mirror 3 is inclined over the substrate 1 by 45 degrees, light, which enters the micromirror actuator of FIG. 1 parallel to the surface of the substrate 1, is reflected perpendicular to the substrate 1 by the mirror 3. On the other hand, light, which enters the micromirror actuator of FIG. 2, directly passes over the surface of the mirror 3 without being reflected by the mirror 3. The operation of the micromirror actuator is controlled by the external magnetic field mentioned above. In most cases, an electromagnet is attached on the bottom surface of the substrate 1 in order to form such a vertical magnetic field.

As shown in FIG. 3, when an external magnetic field is formed, the mirror 3 can rotate about the torsion bars 3a and 3b against the elastic forces of the torsion bars 3a and 3b so as to form a predetermined angle with the substrate 1. On the other hand, when there is no external magnetic field, the mirror 3 rotates so as to be parallel with the surface of the substrate 1 due to the elastic restoring forces of the torsion bars 3a and 3b.

However, as shown in FIG. 4, if a strong external magnetic field is applied to the micromirror actuator after one edge of the mirror 3 contacts the surface of the substrate 1, the torsion bars 3a and 3b cannot maintain their straight shapes and are inevitably bent due to their flexibility. Here, the fact that the torsion bars 3a and 3b cannot maintain their straight shapes, means that the rotation center of the mirror 3 changes and accordingly, the rotation angle of the mirror 3 exceeds a desired level. The torsion bars 3a and 3b are supported at one end by the posts 2a and 2b, respectively. Accordingly, it becomes difficult to obtain a normal inclination angle of the mirror 3 in the conventional actuator, in which the mirror 3 and the torsion bars 3a and 3b are connected to one another. Dotted lines 3a' and 3b' in FIG. 4 indicate the original shapes of the torsion bars 3a and 3b, respectively, before the lower edge of the mirror 3 contacts the substrate 1 and the torsion bars are abnormally deformed. Solid lines in FIG. 4 indicate the shapes of the torsion bars 3a and 3b, respectively, abnormally deformed due to the rotation of the mirror 3.

As described above, if the mirror 3 is sufficiently rotated until one edge of the mirror contacts the surface of the substrate 1 and thus the torsion bars 3a and 3b are deformed, the rotation center of the mirror changes, and the rotation angle of the mirror 3 exceeds a designed angle range. Accordingly, it is impossible to reflect light in a desired direction in an apparatus using the conventional micromirror actuator as an optical switching device.

SUMMARY OF THE INVENTION

To solve the above problems, it is an object of the present invention to provide a micromirror actuator which is capable of precisely controlling the rotation angle of a mirror and preventing light from being reflected into an abnormal path due to abnormal rotation of the mirror.

Accordingly, to achieve the above object, there is provided a micromirror actuator including a substrate; two posts having predetermined heights and installed a predetermined distance apart on the substrate; a element, such as a torsion bar both ends of which are fixed to the posts; a stopper extending from a portion of the torsion bar and contacting or coming apart from the surface of the substrate, e.g., contacting or not contacting a surface of the substrate depending on a state of the torsion bar; a mirror connected to a portion of the torsion bar such as its middle; a driving element, such as parallel elements, connected to the torsion bar being isolated from the mirror and causing the torsion bar to be distorted; and a magnetic component, such as a magnet providing a rotation force to the driving element via an external magnetic field.

Preferably, the mirror is connected to the middle portion of the torsion bar via a connecting portion. Preferably, the parallel elements are symmetrically installed at two opposite sides of the mirror and the magnet is installed on each of the parallel elements. Preferably, the parallel elements are connected to each other via a connecting element and thus are kept in alignment with each other, and the magnet is formed on at least one of the parallel elements.

Preferably, the stopper is formed at the middle portion of the torsion bar and is opposite to a connecting portion connecting the mirror and the torsion bar.

BRIEF DESCRIPTION OF THE DRAWINGS

The above object and advantages of the present invention will become more apparent by describing in detail a preferred embodiment thereof with reference to the attached drawings briefly described below.

DETAILED DESCRIPTION OF THE INVENTION

Figure 1:
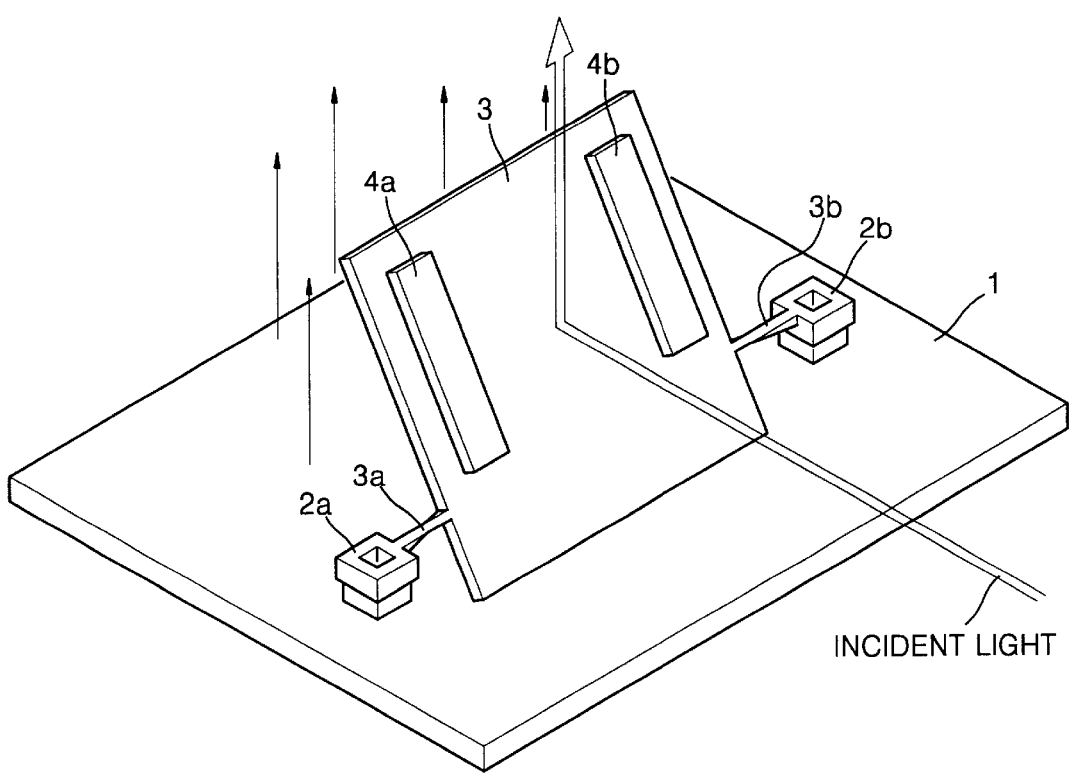
FIG. 1 is a perspective view illustrating a conventional micromirror actuator, in which a mirror inclines over a substrate.
Figure 2:
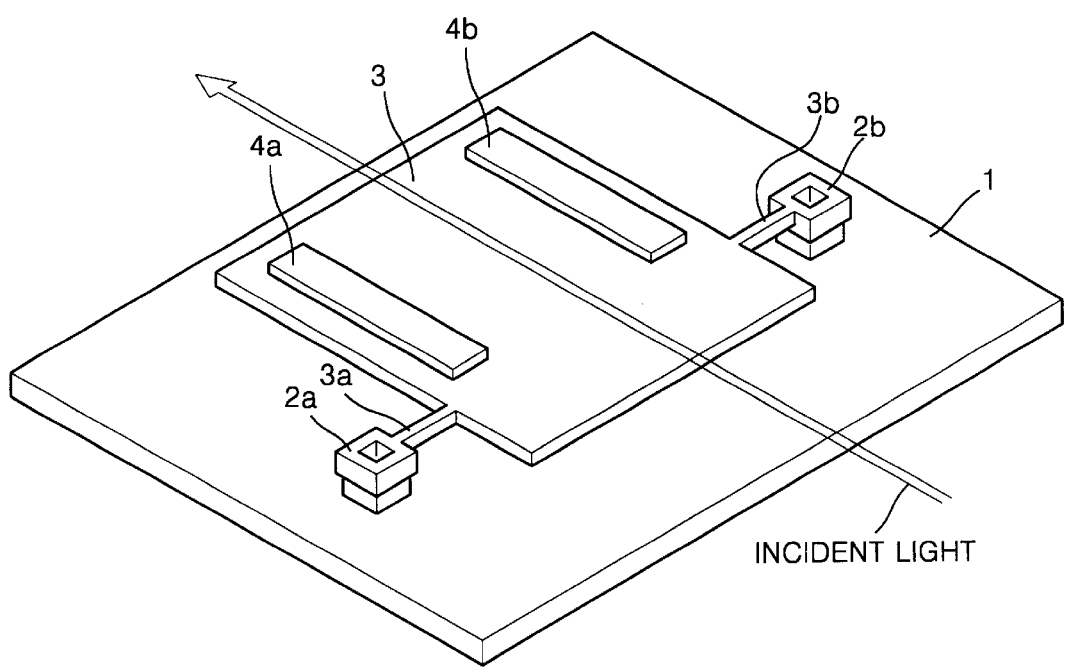
FIG. 2 is a perspective view illustrating the conventional micromirror actuator shown in FIG. 1, in which the mirror is restored to its original state.
Figure 3:
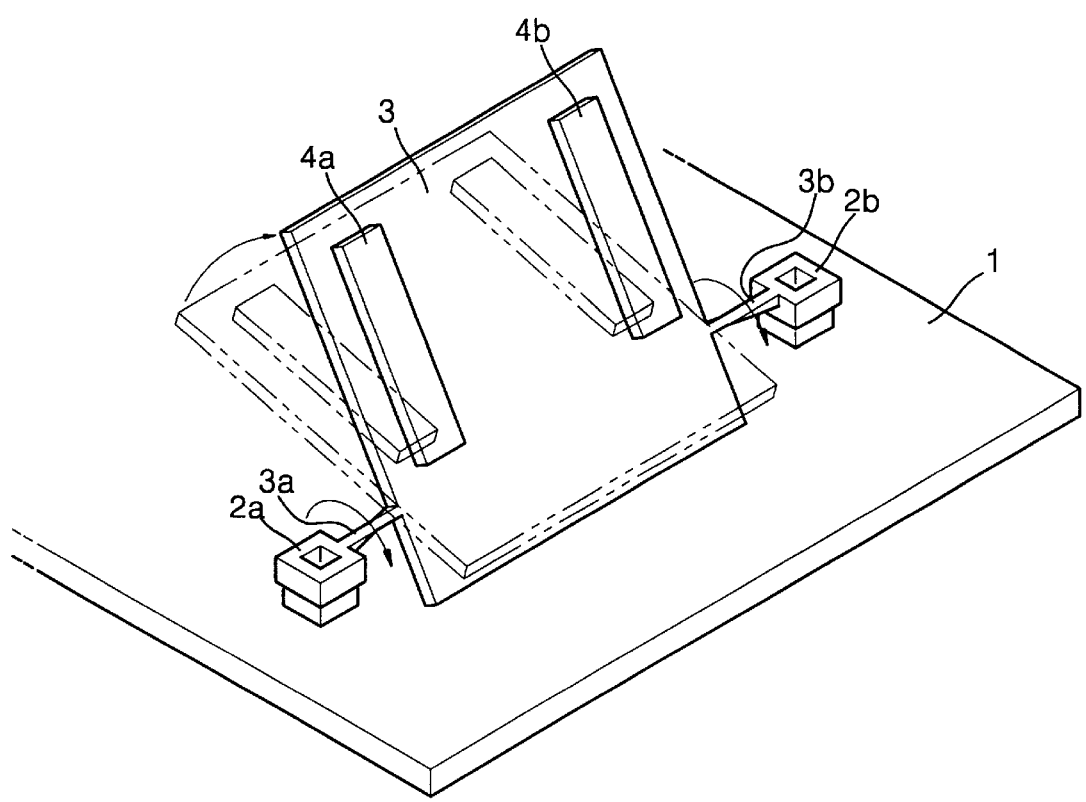
FIG. 3 is a perspective view illustrating the conventional micromirror actuator shown in FIG. 1, in which the mirror is rotated, and thus torsion bars are deformed.
Figure 4:
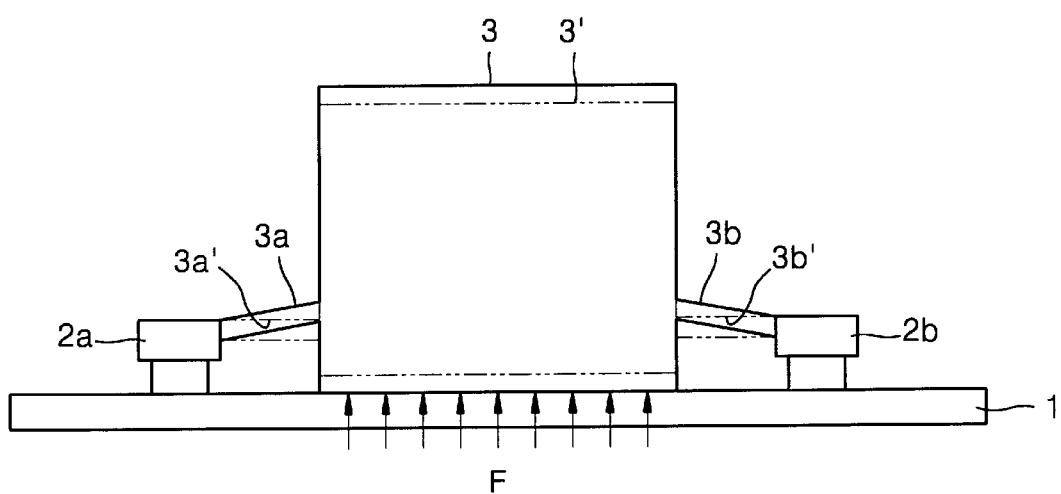
FIG. 4 is a perspective view illustrating the conventional micromirror actuator shown in FIG. 1, particularly, the torsion bars abnormally deformed due to the rotation of the mirror.
Figure 5:
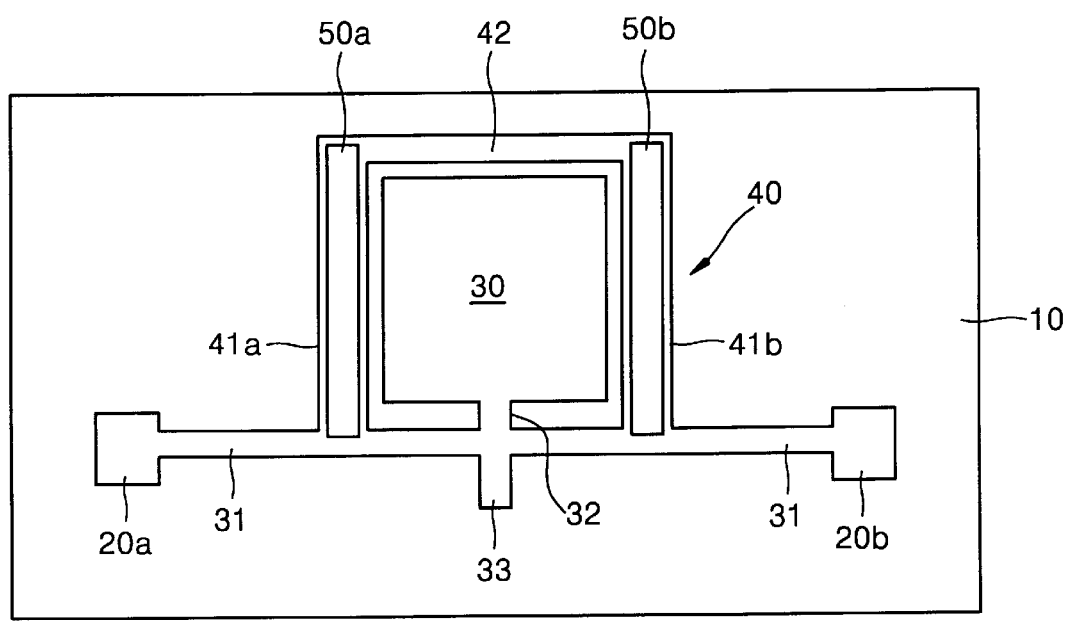
FIG. 5 is a plan view illustrating a micromirror actuator according to the present invention.
Figure 6:
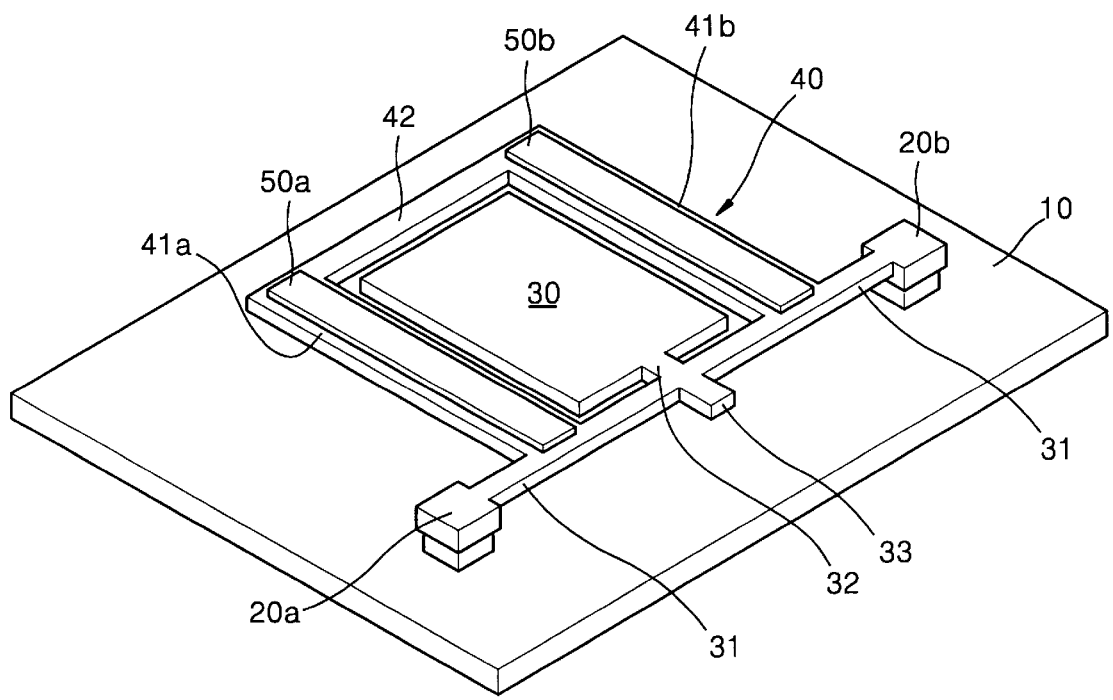
FIG. 6 is a perspective view illustrating the micromirror actuator according to the present invention shown in FIG. 5.

FIG. 5 is a plan view of a micromirror actuator according to the present invention, and FIG. 6 is a perspective view of the micromirror actuator according to the present invention shown in FIG. 5. Referring to FIG. 5, two posts 20a and 20b having predetermined heights are installed a predetermined distance apart on substrate 10, and a single straight torsion bar 31 is fixed to the posts 20a and 20b. A connecting portion 32 and a stopper 33 which contacts or comes apart from the substrate 10 according to the degree to which the torsion bar is twisted, are installed in the middle of the torsion bar 31.

A rectangular frame 40 surrounds the mirror 30. The rectangular frame 40 includes parallel elements 41a and 41b, respectively, placed at a predetermined distance from two opposite sides of the mirror 30, their lower portions connected to the torsion bar 31 and their upper ends connected to a connecting element 42 disposed a predetermined distance away from one edge of the mirror 30. The connecting element 42 is optionally introduced for keeping the parallel elements 41a and 41b synchronized with each other when the parallel elements 41a and 41b are rotated due to an external magnetic field. Preferably, the parallel elements 41a and 41b are installed at the two opposite sides of the mirror 30. However, only one parallel element may be introduced in a structure in which the parallel element and the mirror 30 are installed to be isolated from each other.

Magnets 50a and 50b are installed on the parallel elements 41a and 41b, respectively, for providing sufficient forces to distort the torsion bar 31 through being affected by an external magnetic field. Alternatively, the magnets 50a and 50b may be formed on the connecting element 42 or each of the parallel elements 41a and 41b and the connecting element 42. In other words, as long as the magnets 50a and 50b provide torque to each of the parallel elements 41a and 41b, they may be installed at any place.

The micromirror actuator according to the present invention having such a structure is characterized by the fact that each of the magnets 50a and 50b are designed to be isolated from the mirror. The magnets 50a and 50b are installed on the parallel elements 41a and 41b respectively of the rectangular frame 40, and the parallel elements 41a and 41b are indirectly connected to the mirror 30 via the torsion bar 31. The mirror 30 is connected to the torsion bar 31 via the connecting portion 32 extending from the middle portion of the torsion bar 31 to the mirror 30. The stopper 33 extends from the middle portion of the torsion bar 31 to the opposite direction with respect to the mirror 30. In other words, the connecting portion 32 and the stopper 33 are connected to the middle portion of the torsion bar 31.

Figure 7:
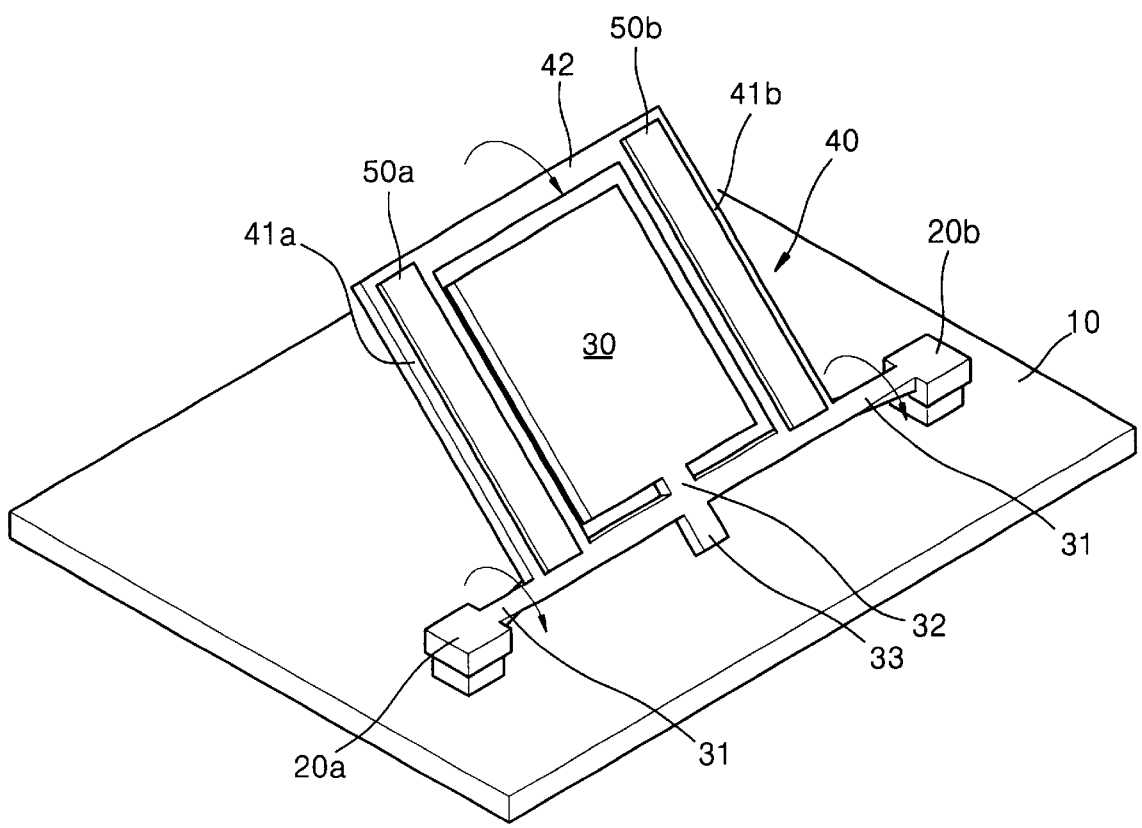
FIG. 7 is a perspective view illustrating the micromirror actuator according to the present invention shown in FIG. 5, particularly, a theoretical state when a mirror is rotated in the micromirror actuator.

Hereinafter, the operation of the micromirror actuator according to the present invention having such a structure will be described. When there is no external magnetic field affecting the substrate 10, the micromirror actuator assumes the position illustrated in FIG. 6. If an external magnetic field with predetermined strength is applied to the substrate 10, as shown in FIG. 7, the magnets 50a and 50b installed in the rectangular frame 40 are affected by the external magnetic field, and thus the parallel elements 41a and 41b supporting the magnets 50a and 50b, respectively, are rotated to incline over the substrate 10 by a predetermined angle. At this time, the torsion bar 31 connected to the parallel elements 41a and 41b is distorted so that the connecting portion 32 connected to the torsion bar 31 and the mirror 30 connected to the connecting portion 32 are rotated. If the mirror 30 is rotated along with the connecting portion 32 to a predetermined angle, the stopper 33 connected to the middle portion of the torsion bar 31 contacts the surface of the substrate 10, and then the inclination angle (or rotation angle) of the parallel elements 41a and 41b with respect to the surface of the substrate 10 does not increase and is maintained at a predetermined level. Accordingly, the mirror 30 is maintained with the same inclination angle (rotation angle) as the parallel elements 41a and 41b.

In other words, if an external magnetic field with appropriate strength so as not to abnormally deform the torsion bar 31 is applied to the torsion bar 31 via the parallel elements 41a and 41b, the inclination angle of the parallel elements 41a and 41b becomes equal to the inclination angle of the mirror 30. Actually, however, it is difficult to minutely control the strength of the external magnetic field, and moreover, it is also difficult to precisely control the rotation angle of each of the parallel elements 41a and 41b.

Figure 8:
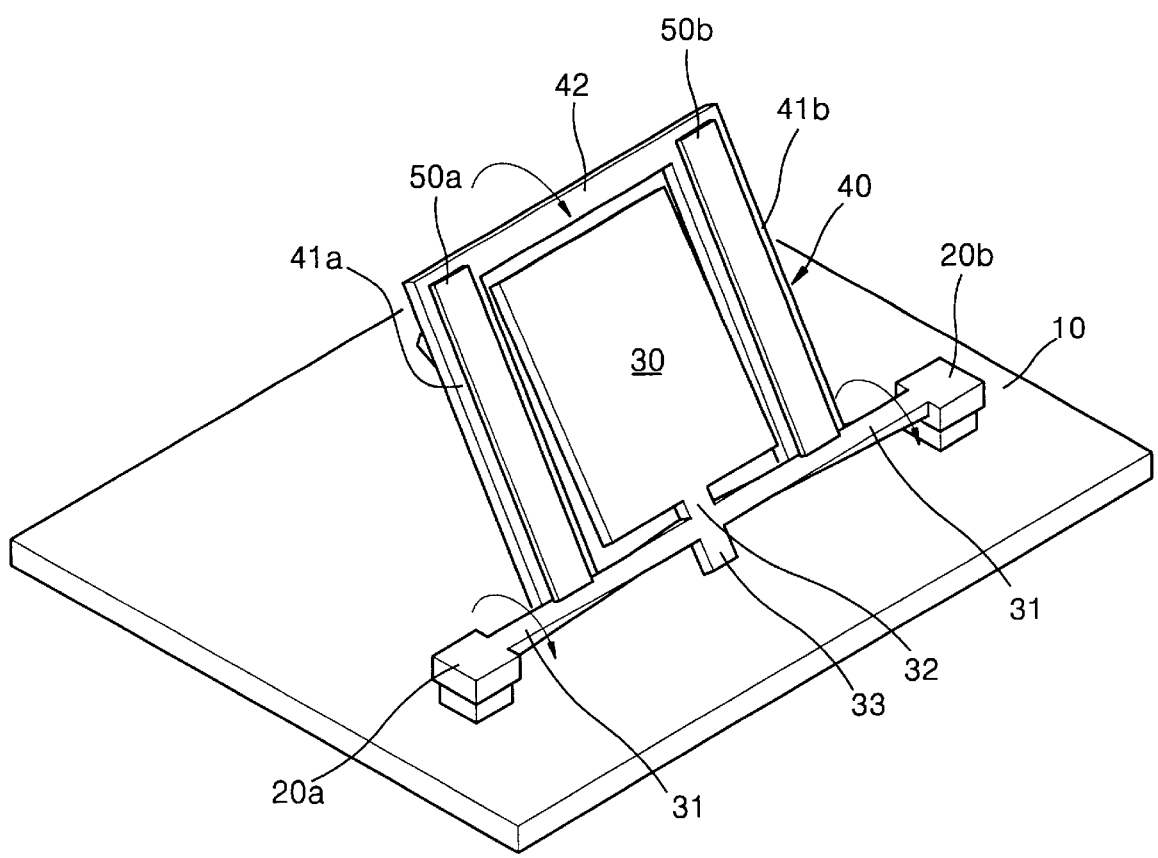
FIG. 8 is a perspective view illustrating the micromirror actuator according to the present invention shown in FIG. 5, particularly, an actual state when a mirror is rotated in the micromirror actuator.

As shown in FIG. 8, when a magnetic field with sufficient strength to cause the parallel elements 41a and 41b to be further rotated is applied to the parallel elements 41a and 41b through the magnets 50a and 50b, the parallel elements 41a and 41b are rotated with a larger rotation angle, and the mirror 30 is rotated with a rotation angle smaller than that of the parallel elements 41a and 41b because the mirror is connected to the middle of the torsion bar 31 via the connecting portion 32, and the stopper 33 prevents the middle portion of the torsion bar 31 from being further rotated.

In a state where the stopper 33 is in contact with the surface of the substrate 10, the parallel elements 41a and 41b are rotated further, portions of the torsion bar 31 between the stopper 33 and each of the posts 20a and 20b, particularly, between the stopper 33 and each of the parallel elements 41a and 41b are distorted along with the both ends of the torsion bar 31.

According to the micromirror actuator of the present invention, even though the rotation angle of the parallel elements 41a and 41b is changed depending on how much force is applied to the parallel elements 41a and 41b after the stopper 33 makes contact with the surface of the substrate 10, the rotation angle of the mirror 30 can be uniformly maintained.

As described above, the micromirror actuator according to the present invention can be applied to a structure, in which a plurality of micromirror actuators are required to be installed in array and mirrors of the plurality of micromirror actuators must be rotated through the same rotation angle. In addition, the rotation angle of the mirror of the micromirror actuator according to the present invention can be uniformly maintained irrespective of a change of the strength of the magnetic field within a predetermined range.

The present invention has been described by way of exemplary embodiment to which it is not limited. Variations and modifications will occur to those skilled in the art without departing from the scope of the present invention as recited in the claims appended hereto. For instance, the present invention can be modified to omit one of the two posts 20a, 20b in a cantilevered embodiment or the torsion bar 31 can be formed of two torsion bars each extending from a post to a mirror 30 or connecting portion 32 of the mirror 30. The stopper 33 can be formed at the connecting portion 32, directly on the mirror 30, or on the torsion bar or bars 31.

What is claimed is:

1. A micromirror actuator comprising:
   a substrate;
   two posts having predetermined heights and installed a predetermined distance apart on the substrate;
   a torsion bar each end of which is fixed to a respective post;
   a stopper extending from a portion of the torsion bar and contacting a surface of the substrate when the torsion bar is in one state and not contacting said surface of the substrate when said torsion bar is in another state;
   a mirror connected to a portion of the torsion bar;
   a driving element connected to the torsion bar which is isolated from the mirror and causes the torsion bar to be distorted; and
   a magnetic component providing a rotation force to the element via an external magnetic field.

2. The micromirror actuator of claim 1, wherein the driving element includes parallel elements and wherein the magnetic component includes elements parallel to one another.

3. The micromirror actuator of claim 2, wherein the mirror is connected to the middle portion of the torsion bar via a connecting portion.

4. The micromirror actuator of claim 3, wherein the stopper is formed at the middle portion of the torsion bar and is opposite to the connecting portion connecting the mirror and the torsion bar.

5. The micromirror actuator of claim 2, wherein the parallel elements are symmetrically located at two opposite sides of the mirror and the elements of the magnetic component are located on respective ones of the parallel elements.

6. The micromirror actuator of claim 1, wherein the driving element includes parallel elements, wherein said parallel elements are connected to each other via a connecting element and thus are kept in synchronization with each other, and the magnetic component is located on at least one of the parallel elements and the connecting element.

7. The micromirror actuator of claim 6, wherein the stopper is located at a middle portion of the torsion bar and is opposite to a connecting portion connecting the mirror and the torsion bar.

8. The micromirror actuator of claim 5, wherein the parallel elements and a connecting element connecting the parallel elements surround the mirror at a predetermined distance away from the mirror.

9. The micromirror actuator of claim 8, wherein the stopper is located at a middle portion of the torsion bar and is opposite to a connecting portion connecting the mirror and the torsion bar.

10. The micromirror actuator of claim 5, wherein the stopper is located at a middle portion of the torsion bar and is opposite to a connecting portion connecting the mirror and the torsion bar.

11. The micromirror actuator of claim 2, wherein the stopper is located at a middle portion of the torsion bar and is opposite to a connecting portion connecting the mirror and the torsion bar.

12. The micromirror actuator of claim 1, wherein the mirror is connected to a middle portion of the torsion bar.

13. The micromirror actuator of claim 12, wherein the stopper is formed at the middle portion of the torsion bar and is opposite to a connecting portion connecting the mirror and the torsion bar.

14. A micromirror actuator comprising:
    a substrate;
    at least one post having a predetermined height and installed on the substrate;
    a torsion bar, an end of which is fixed to the at least one post;
    a mirror connected to a portion of the torsion bar;
    a stopper extending from one of a portion of the torsion bar and said mirror and contacting a surface of the substrate when the torsion bar is in one state and not contacting said surface of the substrate when said torsion bar is in another state;
    a driving element connected to the torsion bar which is isolated from the mirror and causes the torsion bar to be distorted; and
    a magnetic component providing a rotation force to the element via an external magnetic field.

15. The micromirror actuator of claim 14, wherein the mirror is connected to the torsion bar via a connecting portion.

16. The micromirror actuator of claim 14, wherein the stopper is located opposite to the connecting portion connecting the mirror and the torsion bar.

17. A micromirror actuator comprising:
    a substrate;
    two posts having predetermined heights and installed a predetermined distance apart on the substrate;
    a torsion element fixed between said two posts;
    a stopper extending from a portion of the torsion element and contacting a surface of the substrate when the torsion bar is in one state and not contacting said surface of the substrate when said torsion bar is in another state;
    a mirror connected to a portion of the torsion element;
    a driving element connected to the torsion element which is isolated from the mirror and causes the torsion element to be distorted; and
    a magnetic component providing a rotation force to the driving element via an external magnetic field.

18. The micromirror actuator of claim 17, wherein the mirror is connected to the middle portion of the torsion element via a connecting portion.

19. The micromirror actuator of claim 17, wherein the stopper is formed at the middle portion of the torsion element and is opposite to the connecting portion connecting the mirror and the torsion element.

20. A micromirror actuator comprising:

a substrate;

at least one post on the substrate;

a torsion bar, an end of which is fixed to the at least one post;

a mirror connected to a portion of the torsion bar;

a stopper extending from one of a portion of the torsion bar and said mirror and contacting a surface of the substrate when the torsion bar is in one state and not contacting said surface of the substrate when said torsion bar is in another state;

a driving element connected to the torsion bar which is isolated from the mirror; and a magnetic component providing a rotation force to the driving element via an external magnetic field, wherein the driving element has a greater rotation angle than the mirror when a particular rotation force is applied.

21. The micromirror actuator of claim 20, wherein the mirror, the stopper, and the driving element rotate about an axis defined by the fixation of the torsion bar to the at least one post.

22. The micromirror actuator of claim 20, wherein the mirror rotates around only a single axis.

23. A micromirror actuator comprising:

a substrate;

at least one post on the substrate;

a torsion bar, an end of which is fixed to the at least one post;

a mirror connected to a portion of the torsion bar;

a stopper extending from one of a portion of the torsion bar and said mirror and contacting a surface of the substrate when the torsion bar is in one state and not contacting said surface of the substrate when said torsion bar is in another state;

a driving element connected to the torsion bar which is isolated from the mirror; and a magnetic component providing a rotation force to the driving element via an external magnetic field, wherein the stopper prevents the mirror from having the same rotation angle as the driving element when a particular rotation force is applied.

24. The micromirror actuator of claim 23, wherein the mirror, the stopper, and the driving element rotate about an axis defined by the fixation of the torsion bar to the at least one post.

25. The micromirror actuator of claim 23, wherein the mirror rotates around only a single axis.

* * * * *